United States Patent [19]

Galgana

[11] Patent Number: 5,527,211
[45] Date of Patent: Jun. 18, 1996

[54] ADVANCED RUST REMOVER

[76] Inventor: Thomas Galgana, 22 Gannet Rd., Quincy, Mass. 02169

[21] Appl. No.: 319,137

[22] Filed: Oct. 6, 1994

[51] Int. Cl.⁶ .................................................. B24B 19/00
[52] U.S. Cl. ............................ 451/434; 451/28; 451/296
[58] Field of Search ..................................... 451/296, 297, 451/302, 355, 539, 902, 434, 439, 51, 52, 66, 28; 15/256.5

[56] References Cited

U.S. PATENT DOCUMENTS 5,359,813  11/1994  Kaiser, Jr. et al. ..................... 451/296

Primary Examiner—Bruce M. Kisliuk
Assistant Examiner—Derris Banks
Attorney, Agent, or Firm—John P. McGonagle

[57] ABSTRACT

This is a method of removing contaminants from an engine pulley by removably attaching an abrasive strip to a belt which is positioned in a pulley groove, for example. The abrasive of the strip faces the pulley. Running the engine causing the abrasive strip to abrade away any dirt, rust or other contaminant on the pulley.

5 Claims, 3 Drawing Sheets

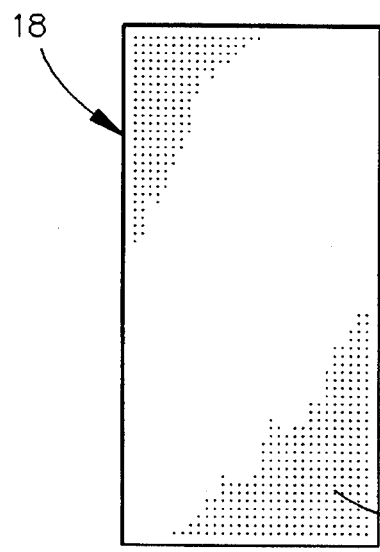  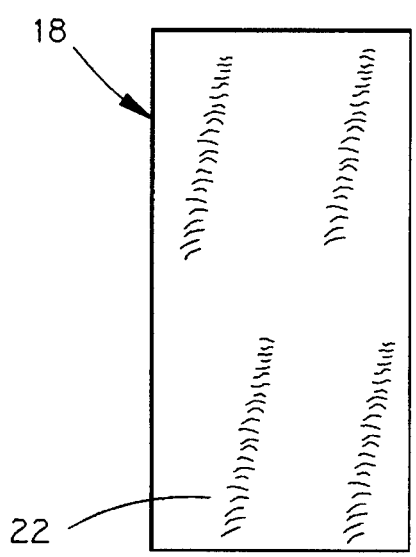
FIG. 2     FIG. 3     FIG. 4
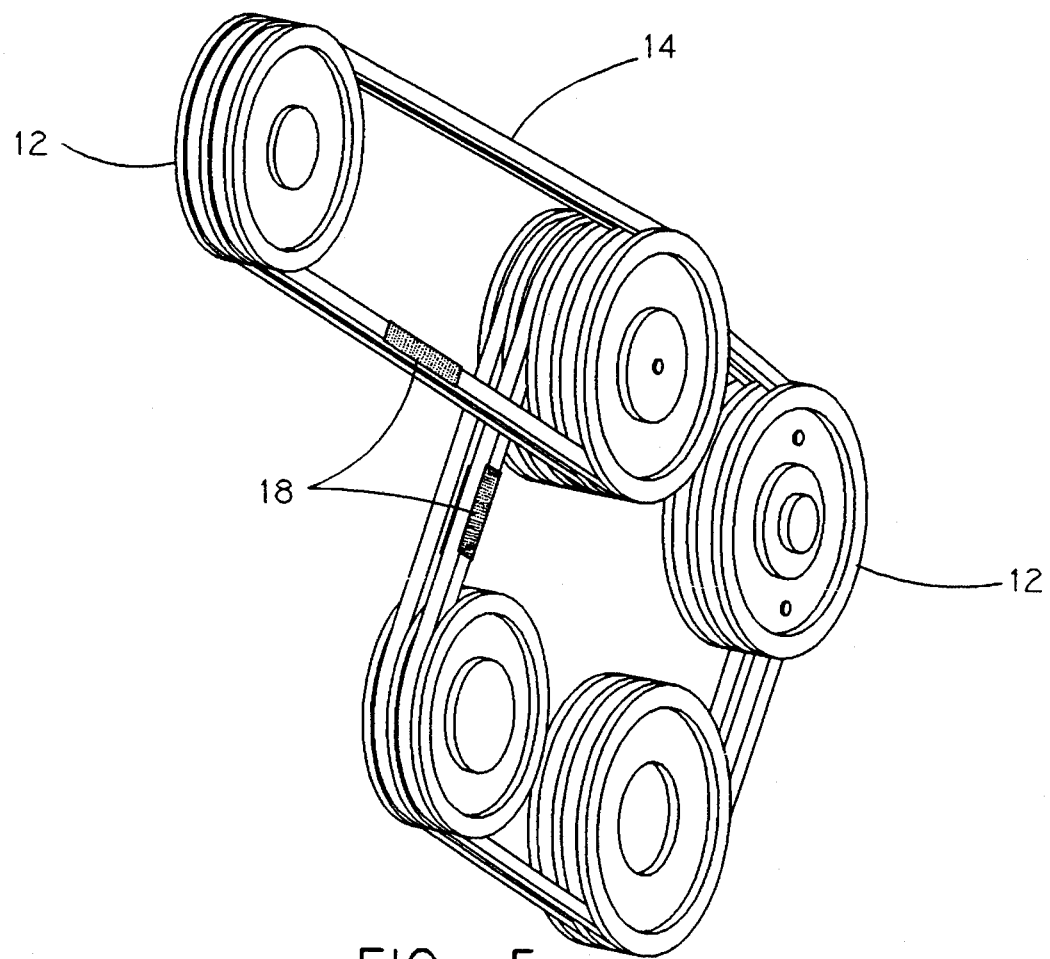
FIG. 5

ADVANCED RUST REMOVER

SUMMARY OF THE INVENTION

The combination of a pulley, an engine and a cleaning strip. The engine includes a belt with the pulley having a circumferential groove and formed of a material that rusts or gets dirty. The system disclosed herein is particularly suited to cleaning the pulley's of a marine engine. The cleaning strip is rectangular in configuration, is adapted to be bent longitudinally and has an abrasive side and a non abrasive side, which may have an adhesive associated therewith. The belt is positioned on the external circumference of the pulley with the abrasive side, sand paper, for example of the cleaning strip abutting the pulley and the non abrasive and adhesive side abutting the belt. The cleaning strip is movably positioned between the external circumference of the pulley and the belt. As the engine operates, the belt and the pulley move causing the abrasive side of the cleaning strip to pass through and around the circumferential groove. Since the abrasive side of the cleaning strip is moving at high speed, it abrades away any dirt, rust or contaminant which may have adhered to the circumferential groove. If the dirt, rust or contaminant are not removed, the engine may break down with the resultant cost to repair the engine and loss of productive time.

BRIEF DESCRIPTION OF THE DRAWINGS

Further details are explained below with the help of the example(s) illustrated in the attached drawings in which:

FIG. 2 is a plan view of the abrasive side of the cleaning strip according to the present invention;

FIG. 3 is a side elevational view of the cleaning strip shown in FIG. 2;

FIG. 4 is a plan view of the adhesive side of the cleaning strip shown in FIG. 2;

FIG. 5 is a perspective view of the pulleys, belts and cleaning strips of the engine shown in FIGS. 1 and 2;

DESCRIPTION OF THE PREFERRED EMBODIMENT(S)

Figure 1:
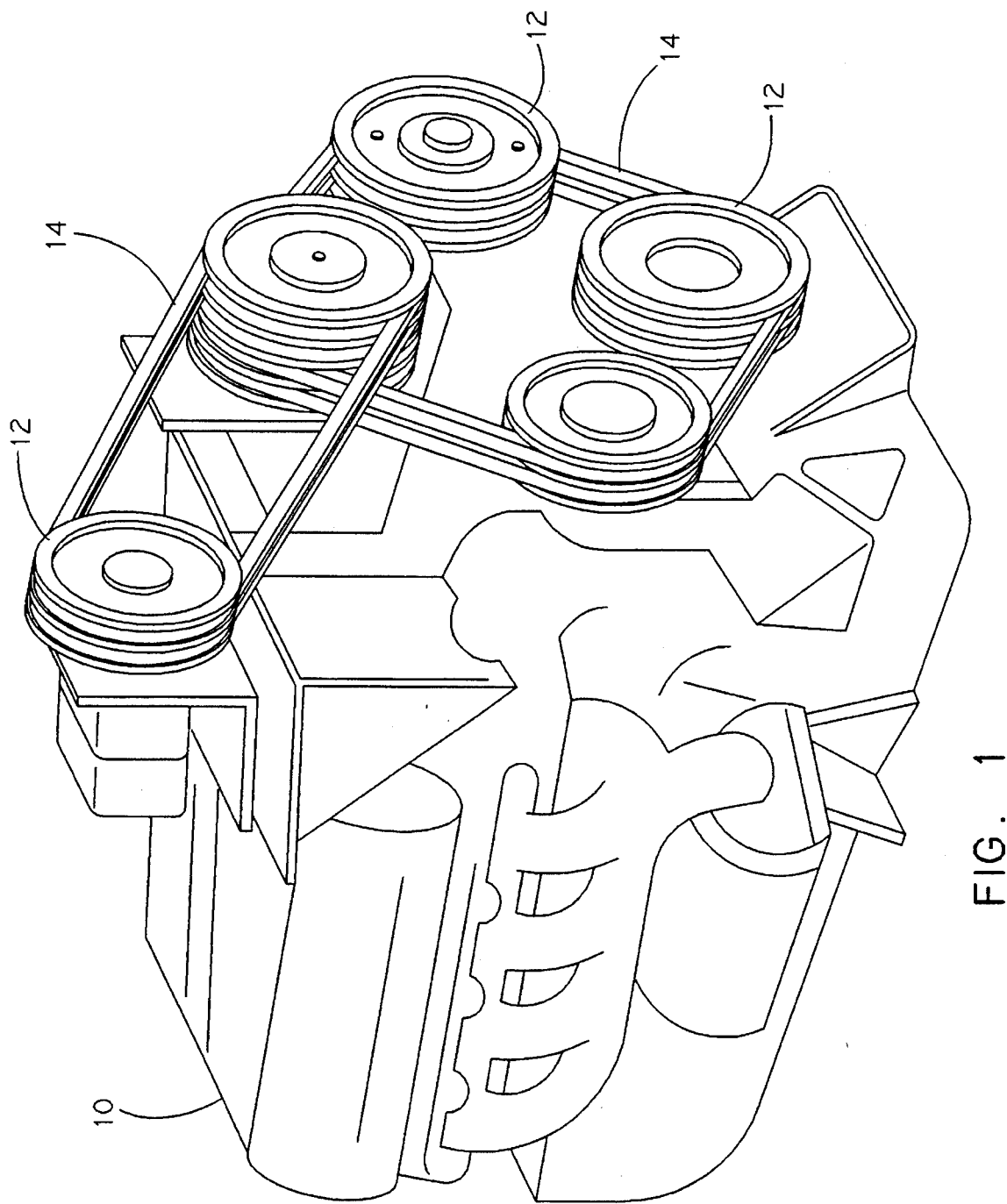
FIG. 1 is a perspective view of an engine having pulleys and belts according to the present invention.
Figures 6, 7, 8:
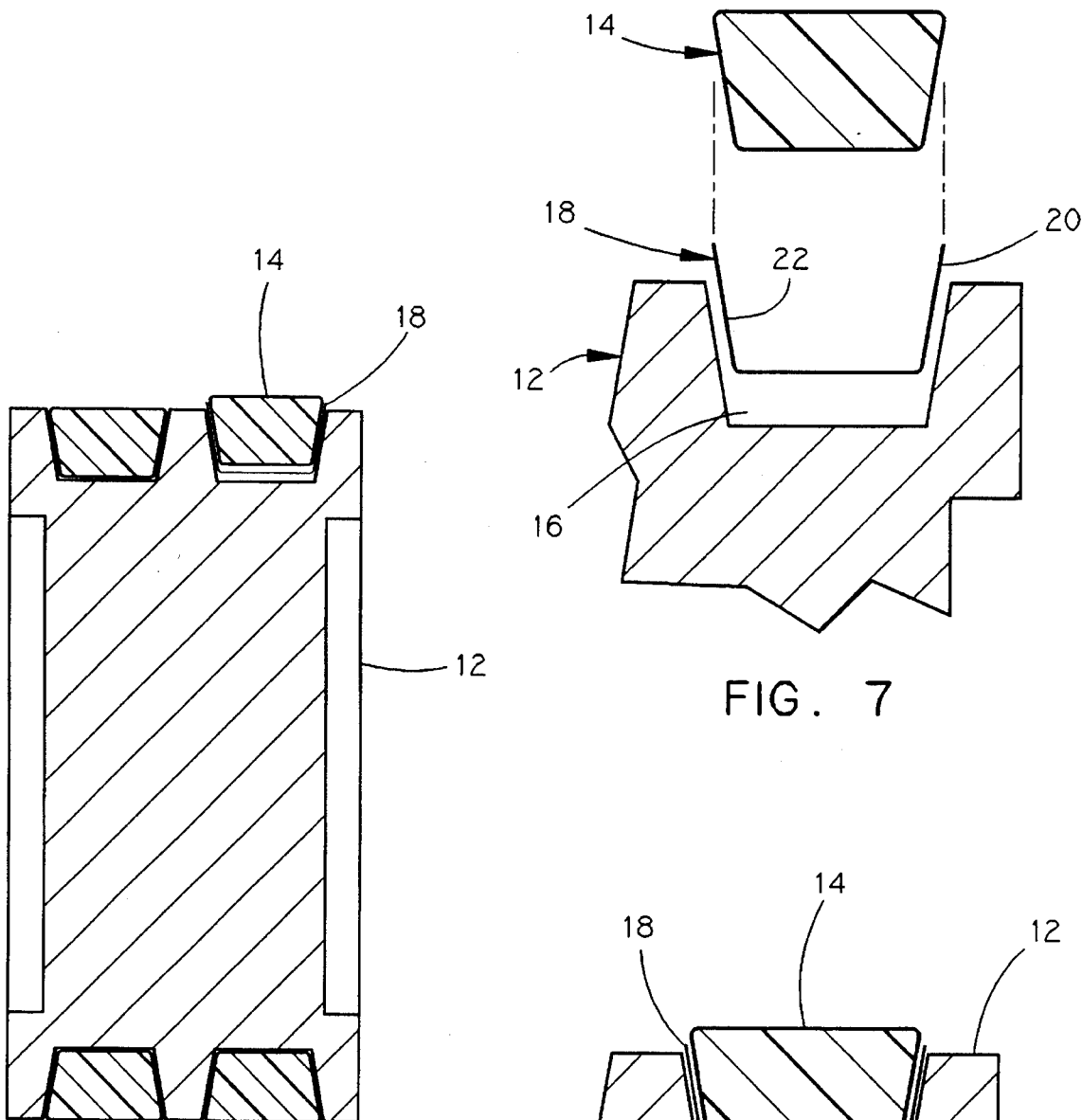
FIG. 6 is a cross sectional view of a double pulley, belts and a cleaning strip engaged in one circumferential grooves of the double pulley according to their present invention.
FIG. 7 is an enlarged, exploded cross sectional view of a belt and a cleaning strip engaged in the circumferential groove of a pulley according to the present invention.
FIG. 8 is an enlarged, exploded cross sectional view of the belt and the cleaning strip engaged in the circumferential groove of the pulley shown in FIG. 7.

There is shown in the drawings an engine 10, which includes pulleys 12 and belts 14. The pulleys 12 each includes a circumferential groove 16 within which one of the belts 14 is positioned and the pulleys 12 may also be formed of a material that rusts, a metallic substance, for example. Buildup of dirt, rust and other contaminants occurs on the pulleys 12 reducing their efficiency in moving the belts 12 and may cause failure of the engine. In the past, it was necessary to use a flat head screwdriver or some similar instrument to manually clean the pulleys 12 of such a contaminated engine. This work was extremely difficult and dangerous. The pulleys 12 may also be formed of plastic.

The applicant's advanced rust remover comprises a cleaning strip 18 having an abrasive side 20 and a adhesive sides 22. The cleaning strip 18 includes some type of adhesive which will allow removable adherance of the cleaning strip 18 to the belt 14.

To clean a metallic or plastic pulley 12 of an engine 10 with the belt 14 partially positioned in the circumferential groove 16 of the pulley 12 and with the pulley 12 and the belt 14 adapted to move. The cleaning strip 18 is removably positioned on the lower surface of the belt 14 utilizing its side 22 and leaving its abrasive side 20,, for example, facing away from the belt 14. The abrasive side 20 of the cleaning strip 18 will at some stage of the movement of the belt 14 pass over the circumferential groove 16 of the pulley 12 cleaning any dirt, rust and other contaminants at a fraction of the time it would take to clean the pulley 14 manually without the attendant dangers of a manual cleaning. When the cleaning is completed the cleaning strip 18 is stripped from its engagement to the belt 14.

What I claim is:

1. The combination of an engine and a cleaning strip, the engine including a pulley and a belt, the pulley having an external circumference and formed of a material that rusts, the cleaning strip having an abrasive side and an adhesive side, the belt positioned on the external circumference of the pulley, the pulley and the belt adapted to move, the cleaning strip removably positioned between the external circumference of the pulley and the belt with the abrasive side of the cleaning strip abutting the pulley and the adhesive side abutting the belt.

2. The combination of an engine and a cleaning strip, as setforth in claim 1 wherein the pulley includes a circumferential groove and the belt positioned in the groove.

3. The combination of an engine and a cleaning strip, as setforth in claim 2 wherein the engine being a marine engine.

4. The combination of an engine and a cleaning strip, as setforth in claim 3 wherein the pulley is a crankshaft pulley.

5. The method of cleaning an engine pulley while the pulley is engaged to its belt and to the engine comprising the steps of removeably attaching an abrasive cleaning strip to the belt with the abrasive facing the pulley, running the engine thereby causing the abrasive strip to abrade away contaminants on the pulley.

* * * * *